Oct. 22, 1968  D. G. STERRY  3,407,305
OPTICAL ROTATIONAL SEISMOMETER
Filed Oct. 26, 1966

INVENTOR.
D. G. STERRY
BY Young & Quigg
ATTORNEYS

United States Patent Office 3,407,305
Patented Oct. 22, 1968

3,407,305
OPTICAL ROTATIONAL SEISMOMETER
Dan G. Sterry, Houston, Tex., assignor to Phillips Petroleum Company, a corporation of Delaware
Filed Oct. 26, 1966, Ser. No. 589,637
9 Claims. (Cl. 250—225)

This invention relates to the measurements of vibrations which occur in preselected directions using an optical detection system.

In geophysical prospecting, it is common practice to detonate an explosive charge at a first location near the surface of the earth. This establishes vibrations which travel downwardly through the earth and which are reflected or refracted back toward the surface. A plurality of seismometers are located in spaced relationship from the shot point to detect these vibrations. In many operations, the seismometers are responsive to all of the vibrations which are received at the seismometer locations. The detected vibrations thus include those which have traveled through the earth and are reflected or refracted back from subterranean formations. However, the seismometers also receive waves which are propagated along the surface of the earth directly from the shot point. Since these surface waves are superimposed upon the desired signals, it is often difficult to interpret the records so as to distinguish the desired vibrations from the undesired surface waves.

In the United States Patent 2,657,373 to R. G. Piety, there is disclosed a system for eliminating the effect of ground waves such as Rayleigh waves or ground roll in seismic records. This is accomplished by employing two separate seismometers at each location which receive vibrations. One of these seismometers is responsive solely to ground waves which tend to impart a rotational movement. The output of this seismometer is combined with the output of a conventional seismometer in such a manner as to minimize the effect of the ground waves in the resulting composite record.

While rotational seismometers have been used for many years, their acceptance and usefulness has been limited by the fact that they are relatively complex. Also there is a tendency for some translational motion to enter the signal produced by existing rotational seismometers; for instance, the plates of capacitance-type seismometers or the coils in a magnetic-type seismometer may be vibrated by translational motion thus causing relative movement of the elements thereby generating an extraneous signal.

It is an object of this invention to provide a rotational seismometer of exceptional simplicity.

It is a further object of this invention to provide a rotational seismometer capable of detecting rotational motion to the substantially complete exclusion of translational motion.

It is a still further object of this invention to provide a rotational seismometer which is rugged in construction, reliable in operation, can be readily adjusted, and is economical to manufacture.

In accordance with this invention a polarizing light filter and an analyzing polarizing light filter are carried coaxially on a housing. One of these polarizing filters is mounted rigidly to the housing so as not to be movable relative to the housing and is connected to the other by means of a flexible coupling which allows the filters to rotate relative to each other. A light source is beamed through the filters and thence to a photo cell. When vibrations are received by the housing, the housing—and hence the rigidly mounted polarizing filter—is displaced in the direction of the vibrations; however, the other polarizing filter tends to remain stationary because of its inertia thus creating relative rotational motion between the two filters about their common axis. This results in a variation in the light transmission which can be detected by the photocell.

In the drawings, forming a part hereof, in which like reference characters represent like elements in the various views.

Figure 1:
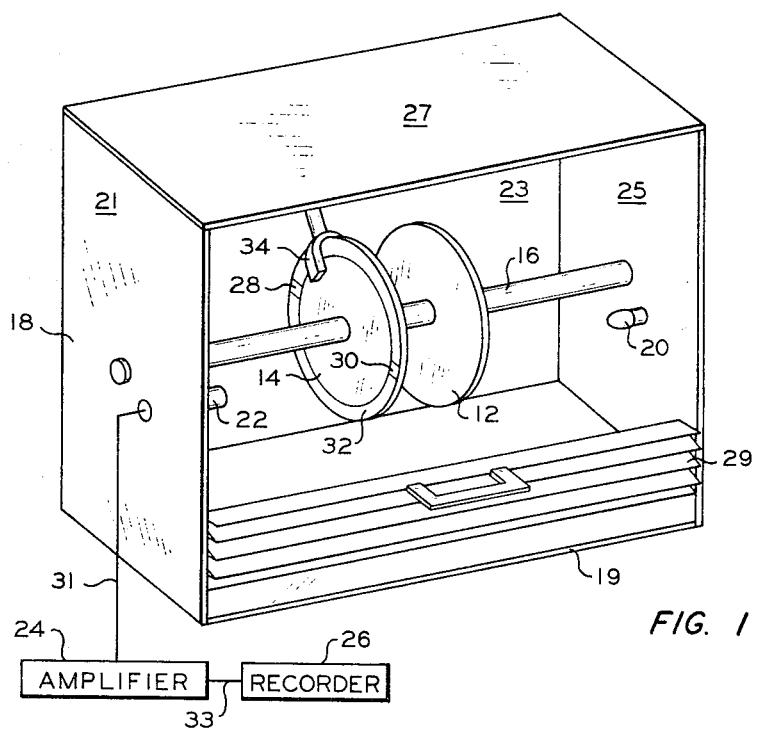
FIGURE 1 is a perspective view of one embodiment of the rotational seismometer of this invention with auxiliary equipment shown in diagrammatic form.

Rigidly mounted polarizing light filter 12 and stationary polarizing light filter 14 are coaxially mounted on shaft 16 which is carried by housing 18, said housing having a base 19, walls 21, 23, and 25, top 27, and folding front wall cover 29.

Filter 12 is rigidly mounted to the shaft and the shaft is rigidly mounted to the frame; thus filter 12 is not movable relative to housing 18. Filter 14 is mounted on a flexible pivot so as to be rotatable relative to filter 12. Thus, rotatably mounted filter 14 is the stationary filter while rigidly mounted filter 12 rotates along with the housing about the common axis and relative to filter 14. A light source 20 beams light through rigidly mounted filter 12, then through stationary filter 14 and thence to a light sensitive detector such as photocell 22. The signal generated by photocell 22 is fed to amplifier 24 through conduit 31 and thence to recorder 26 via conduit 33. Weights such as weights 28 and 30 on the stationary filter 14 increase its inertia. An electrical damping system comprises soft iron ring 32 around filter 14 and a magnet 34 which establishes a magnetic field which retards movement of iron ring 32.

Figure 2:
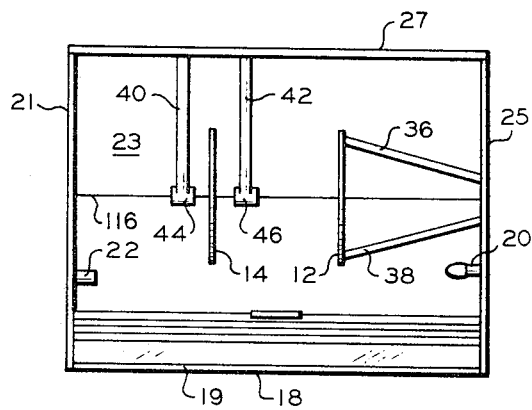
FIGURE 2 is an elevation view of an alternate type of flexible coupling between filters.

Referring now to FIGURE 2 there is shown an alternate type of flexible coupling wherein the filters 12 and 14 are mounted rigidly on a fine wire 116 which serves as the shaft. Supports 36 and 38, mounted so as not to interfere with the light beam, hold filter 12 rigid with respect to the housing. Supports 40 and 42 carry bushings 44 and 46 which prevent any translational motion but allow rotational motion due to the resiliency of the wire.

Figure 3:
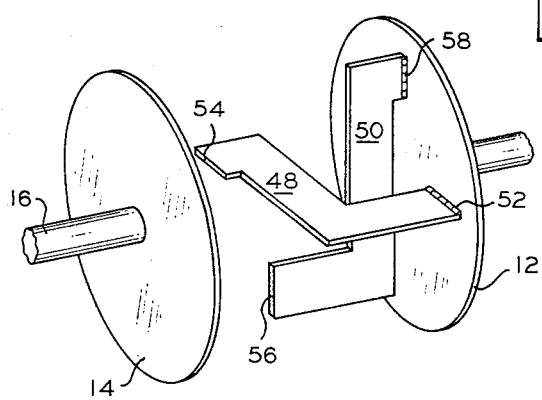
FIGURE 3 is an exploded view of a preferred type of flexible coupling between filters.

Referring now to FIGURE 3 there is shown another alternate type of flexible coupling which is the presently preferred form for this coupling wherein the filters 12 and 14 are connected together by elongated resilient flexure plates 48 and 50. Each flexure plate is secured to filter 12 at one end and to filter 14 at the other end. That is, flexure plate 48 is secured to filter 12 along weld line 52 and to filter 14 along weld line 54. Flexure plate 50 is secured to filter 14 along weld line 56 and to filter 12 along weld line 58. While it is not shown in the exploded view, the positioning of weld line 54 on filter 14 is identical to the positioning of weld line 58 on filter 12 and the positioning of weld line 56 on filter 14 is identical to the positioning of weld line 52 on filter 12. The weld lines may be formed by an adhesive or, alternatively, the flexure plates can be provided with brackets and secured to the filters with screws, or they may be affixed by any other suitable means.

When assembled the hinges 48 and 50 are at right angles to each other and said hinges lie in planes defined by the axis of filters 12 and 14. This resilient hinge is very effective in eliminating translational movement of the filters. Thus, although the filters are free to rotate relative to each other, the resilient hinge prevents either axial or transverse displacement thereof with respect to the housing. In addition, the resilient hinge biases the polarizing light filters to a predetermined angular position with respect to each other.

While filter 14 is shown in FIGURE 3 connected directly to shaft 16, it can be connected to shaft 16 through another resilient hinge identical to that formed by flexure plates 48 and 50, thus being suspended between two flexible hinges.

In order to increase the strength of the signal generated, multiple light sources and photocell detection units can be utilized, either feeding into a common amplifier or with individual preamplifiers. Also a pulsed light source can be utilized to enable A-C amplification of the signal which is subsequently converted back to D-C.

In operation the seismometer is positioned with its base 19 on the surface of the earth with wall 23 perpendicular to the direction of travel of the ground waves. Any vibrations received tend to tip base 19; this rotational motion is imparted to the entire assembly including filters 12 and 14. However, because of the inertia of filter assembly 14, it tends to remain stationary thus creating a relative rotational motion between filter 12 and filter 14. As is well known by those skilled in the art, when a pair of polarizing filters are aligned, maximum light can pass through. However, when the polarizing filters are at right angles to each other, or crossed, minimum light will be allowed to pass. At any point relative rotation of two polaroid filters will increase or decrease the amount of light allowed to pass. Thus as the filters 12 and 14 are rotated relative to each other in response to the ground wave or rotational vibrations received, the amount of light reaching photocell 22 varies. This causes photocell 22 to put out a varying signal which is amplified and recorded, the variations in the recorded signal corresponding to the ground wave vibrations received by the rotational seismometer.

As will become evident from the discussion to follow, this instrument is exceptionally selective in detecting rotational motion to the substantially complete exclusion of translational motion. In the first place, filters can be mounted on a shaft in such a way that relative straight line motion between them is not possible. As noted hereinbefore the preferred form of flexible coupling is particularly effective in preventing either transverse or axial motion between the filters. Furthermore, even if lateral or vertical motion did occur between the two filters it would have substantially no effect on the light transmission so long as neither of the filters moved out of the path of the light beam. Nor would vibrations set up by translational motion which might tend to cause the filters to move alternately closer together and farther apart have any substantial effect on the light transmission. Rather only relative rotational motion between the polaroid filters has any substantial effect on the light transmission. It is apparent that with a capacitor-type detector for instance any movement between the plates either in the way of lateral motion—which would change the operable surface area between the plates comprising the capacitor—or in the way of vibrations—which would change the spacing of the plates—would affect the signal being generated. Similarly any relative straight line motion of the coils in a magnetic rotational seismometer would affect the signal being generated.

It is manifest that the rotational seismometer of the instant invention is of extraordinary simplicity and yet is able to perform the relatively complex task of selectively detecting rotational seismic vibrations to the almost complete exclusion of translational vibrations. Since the spacing between the filters, light, and photocell is not critical the instrument is less susceptible to damage due to rough handling and is, of course, easy to construct. The only critical elements in the construction of this instrument are that the stationary filter should be balanced about its center and mounted coaxially with the rigidly mounted filter.

While the drawings show the polarizing filter as being rigidly mounted and the analyzing polarizing filter as being stationary, the light can be beamed through from the opposite direction; that is, the stationary filter can be the polarizing filter and the rigidly mounted filter can be the analyzing polarizing filter.

Frequently it will be desired to dampen the movement of the stationary filter. This can be done by any known means such as electrical dampening or fluid dampening. If electrical dampening is used, a ring of magnetic material such as soft iron can be affixed to the stationary polaroid and a magnetic field created which this magnetic material must move in. This can be done with any conventional apparatus such as electromagnets or permanent magnets.

It may be desirable to add weight to the stationary filter in order to increase its inertia, particularly if a ring of magnetic material is not used.

The polarizing filters can be made of any optically anisotropic materials such as Nicol prisms, tourmaline crystals, or synthetic polarizing plastic films such as those prepared by forming parallel rows of needle-shaped crystals of iodosulphate of quinine in a nitrocellulose mastic. The two filters can be identical or each can be composed of a different material or be of a different thickness or shape; for instance they can both be made of identical synthetic polarizing films.

The detector can be any known light sensitive device such as a photoconductive cell, a photo voltaic cell, or any of the other photocells which are commercially available.

The light source can be any source which produces light which has components which are selectively transmitted by the polarizing filters. An ordinary incandescent lamp is particularly suitable; or the rays of the sun may be focused and utilized as the light source. It is necessary to exclude all extraneous light which would affect the photocell.

Any flexible coupling can be used between the two filters which will allow relative rotational movement between them. The preferred coupling is shown in FIGURE 3. The stationary filter can also be mounted to shaft 16 through a highly resilient rubber bushing. Also the stationary filter can be mounted on the shaft so as to be otherwise freely rotatable and be held in a neutral position by means of a spring. It is generally preferred that the spring constant of the flexible coupling combined with the moment of inertia of the stationary filter give the system a low resonant frequency, preferably on the order of 5 to 35 cycles per second, although the mechanical tuning of the flexure plates can be varied in conjunction with a variation in the impedance within the amplification circuit, thus varying the time derivative of the earth movement to which the seismometer is responsive. That is, by changing these factors the output of the seismometer can be changed so that it represents displacement, velocity, acceleration, or rate of change of acceleration, as desired.

The recorder can be any conventional recording means for recording on photographic or magnetic tape and the like.

While this invention has been described in detail for the purpose of illustration it is not to be construed as limited thereby, but is intended to include all changes and modifications within the spirit and scope of the invention.

I claim:

1. A seismometer for measuring the rotational component of seismic waves comprising in combination: a housing; a polarizing light filter rigidly mounted to said housing; a stationary polarizing light filter carried coaxially to said rigidly mounted filter and connected to said rigidly mounted filter by a flexible coupling which allows said rigidly mounted filter and said stationary filter to rotate relative to each other; at least one light source positioned so as to beam light through both of said filters; and at least one light sensitive detector positioned to receive light passing through both filters.

2. Apparatus according to claim 1 wherein said flexible coupling comprises two flexure plates mounted at right angles, one end of each flexure plate being operably attached to said stationary filter and the other end operably attached to said rigidly mounted filter.

3. Apparatus according to claim 1 wherein said flexible coupling comprises a fine wire.

4. Apparatus according to claim 1 wherein said filters comprise synthetic plastic films.

5. Apparatus according to claim 1 including means for dampening the movement of said stationary filter.

6. Apparatus according to claim 1 wherein the spring constant of said flexible coupling and the moment of inertia of the stationary filter are such that the system has a resonant frequency of from 5 to 35 cycles per second.

7. Apparatus according to claim 1 comprising in addition: an amplifier, said amplifier being operably connected to said light sensitive detector; and a recorder, said recorder being operably connected to said amplifier.

8. Apparatus according to claim 7 wherein: said flexible coupling comprises two flexure plates mounted at right angles, one end of each flexure plate being operably attached to said stationary filter and the other end operably attached to said rigidly mounted filter; and said apparatus comprises in addition means for dampening the movement of said stationary filter.

9. Apparatus according to claim 8 wherein the spring constant of said flexible coupling is such that the system has a resonant frequency of from 5 to 35 cycles per second.

No references cited.

JAMES W. LAWRENCE, *Primary Examiner*

W. J. SCHWARTZ, *Assistant Examiner.*